United States Patent Office.

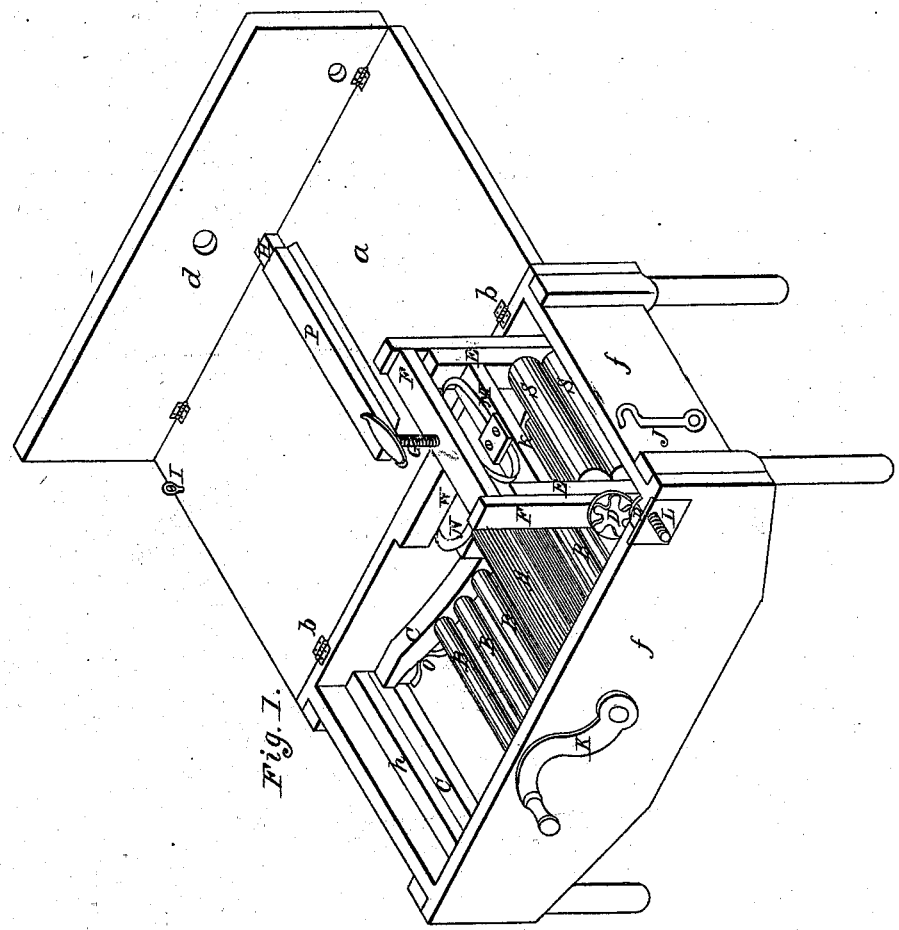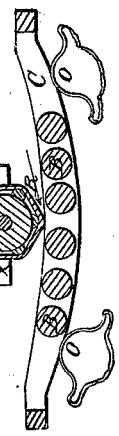

JACOB WEAVER, JR., OF PITTSBURG, PENNSYLVANIA.

Letters Patent No. 89,838, dated May 4, 1869.

IMPROVED WASHING-MACHINE.

The Schedule referred to in these Letters Patent and making part of the same.

*To all whom it may concern:*

Be it known that I, JACOB WEAVER, Jr., of the city of Pittsburg, county of Allegheny, and State of Pennsylvania, have invented a new and useful Improved Washing-Machine; and I hereby declare the following to be a full and exact description of the same, reference being had to the accompanying drawing, and to the letters marked thereon.

Drawing 1 is a perspective view of the machine.

The body of the machine, marked $f$, is a frame similar to that of a table, supported by four legs, having a sloping or curved bottom from the ends toward the centre, fastened together in the usual manner.

A loose frame-work or cradle, marked C, set upon the steel springs O, galvanized or otherwise, is made to set inside the box or body of the machine, and is made so as to work loosely.

The end pieces of this frame are securely fastened to the side pieces.

The springs O are fastened to the inner sides of this frame, near the ends, as shown in drawing 2, or may be attached in the centre, underneath, on the end pieces, in which case but two springs may be used.

The springs are fastened to their places by an iron clip and screws.

The bottoms of the springs are loose, working on and setting on the bottom of the washing-machine, and are so adjusted as to resist a downward pressure.

The side pieces of this loose frame or cradle may be made straight, curved, or angular, and on their inside centres are made holes of such diameter and depth, equidistant from centre to centre, to receive the ends of the rollers B, which operate as a rolling-floor.

The rollers B are to have such bearings on each end so as to fit these holes.

Letter $h$ is a narrow strip, screwed on the inside of the machine, to keep the loose frame or cradle to its place, to prevent it from working or having too much elasticity.

A wooden button may be adjusted in the centre to answer the same purpose.

The three central rollers B may be covered with rubber, or not.

Letter $a$, in drawings 1 and 2, represents the washer, or roll, of such diameter and length as to suit the rollers B and the loose frame or cradle C. This washer, or roll, is fluted or corrugated.

Said indentations may be regular or otherwise; but I prefer forming exact involute and evolute curves, the face and diameter of which are equal to those of the rollers B, and their depth equal to one-half of such diameter.

Through this washer or roll, in the centre, is to be an iron shaft, the rear end to have a bearing planed to work in a slotted box or hole, half through the side of the washing-machine, so adjusted as to work up and down.

This bearing, instead of iron may be of wood, turned on the roll A, same as on the rollers B.

The crank-end of the shaft for the bearing may also be of wood; if of iron, to extend such length outside the washing-machine, so as to attach the crank.

Between the inside of the machine and each end of the washer or roll, in the space above the shaft occupied by the side pieces of the loose frame or cradle $c$, is a cleat of wood, marked W, screwed on the side of the washing-machine, attached to the under side of which is fastened the steel spring N.

To the lower or bottom side of these springs is attached a piece of wood with a bearing sunk to one-half the diameter of the shaft of the washer or roll A, upon which it works and rests.

The action and adjustment of these springs, holding these pieces of wood to their position, playing on the shaft of the roll A, compresses the same down against the rollers B.

The washer, or roll A, is covered with tubular India-rubber cloth, marked R, drawn on tightly, from which great smoothness and elasticity are derived.

Thus adjusted, attach the crank $k$, and the machine is ready for operating.

The great point to be arrived at, and to attain in washing-machines hitherto, has been to produce a really labor-saving machine, which would not only perform its work well and expeditiously, to be manipulated with ease, but to effectually obtain such combined elastic pressure and rubbing motion at the same time, so as not to break, wear, or tear the lightest or heaviest fabrics.

Having now described my invention,

What I claim as my invention, and desire to secure by Letters Patent of the United States, is—

The combination of the roll A with the India rubber R, the spring N, the frame C, and rollers B, and springs O, as and for the purposes specified.

JACOB WEAVER, JR.

Witnesses:
 GEO. H. KEHEW,
 S. S. WALTERS.